(12) United States Patent
Prasad

(10) Patent No.: US 7,801,972 B1
(45) Date of Patent: Sep. 21, 2010

(54) MOBILE DEVICE ACCESS TO BACK OFFICE DATA STORE

(75) Inventor: Ashim Prasad, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 803 days.

(21) Appl. No.: 11/621,563

(22) Filed: Jan. 10, 2007

(51) Int. Cl.
*G06F 15/16* (2006.01)
(52) U.S. Cl. .................. 709/218; 709/201; 709/203; 709/219; 709/229; 709/230; 340/286; 340/635; 707/3; 707/4; 707/101
(58) Field of Classification Search .................. 709/201, 709/203, 219, 229, 230; 340/286, 635; 707/3, 707/4, 101
See application file for complete search history.

(56) References Cited

U.S. PATENT DOCUMENTS 7,151,438 B1 * 12/2006 Hall et al. .............. 340/286.06
2006/0095511 A1 * 5/2006 Munarriz et al. ............ 709/203
2007/0067725 A1 * 3/2007 Cahill et al. ................. 715/733
2007/0294646 A1 * 12/2007 Timmons ..................... 715/864
2008/0155118 A1 * 6/2008 Glaser et al. ................ 709/238

* cited by examiner

*Primary Examiner*—Wing F Chan
*Assistant Examiner*—Benjamin M Thieu

(57) ABSTRACT

A method is provided for mobile device access to back office data store. A data request is received from a mobile device, wherein the data request is associated with a really simple syndication format file link to a data file in a back office data store. The data request is conveyed through a firewall to the back office data store, wherein the firewall permits only conveying the data request. The data file is accessed in the back office data store. The data from the data file is formatted for the mobile device. The formatted data is communicated to the mobile device.

17 Claims, 4 Drawing Sheets

MOBILE DEVICE ACCESS TO BACK OFFICE DATA STORE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Enterprise employees often attempt to access data stored in the computers located in an enterprise office while the employees are not at the office. On occasions such an employee uses a portable computer to access the data, but often the employee is not able to access the data using the portable computer because the employee does not have the portable computer or does not have internet access for the portable computer. The employee cannot use a mobile phone to access the data because the mobile phone has no capability to access the data through a firewall providing security for the data. If the portable computer uses internet access to the data through the firewall, security for a back office data store is decreased because the firewall permits commands to modify data. The above-described situations present unique security problems that are not adequately addressed by existing data access systems.

SUMMARY

The present disclosure provides systems and methods for mobile device access to back office data stores. In some method embodiments, a data request is received from a mobile device, wherein the data request is associated with a really simple syndication file format link to a data file in a back office data store. The data request is conveyed through a firewall to the back office data store, wherein the firewall permits only conveying the data request. The data file is accessed to obtain data from the back office data store. The data from the data file is formatted for the mobile device. The formatted data is communicated to the mobile device.

In some system embodiments, the system includes a memory; and a processor configured to execute communication server software in the memory. The communication server receives a data request from a mobile device, wherein the data request is associated with a really simple syndication file format link to a data file in a back office data store. The communication server conveys the data request through a firewall to the back office data store, wherein the firewall permits the communication server to only convey the data request. Next, the communication server accesses the back office data store; formats data from the data file for the mobile device; and communicates the formatted data file to the mobile device.

In some other system embodiments, the system includes a back office data store, a mobile device; and a communication server. The communication server receives a data request from the mobile device, wherein the data request is associated with a really simple syndication file format link to a data file in the back office data store. The communication server compares the data request against a permitted level of access, and conveys the data request through a firewall to the back office data store if the data request met the permitted level of access, wherein the firewall permits the communication server to only convey the data request. The communication server accesses the back office data store; formats data from the data file for the mobile device; and communicates the formatted data file to the mobile device.

These and other features and advantages will be more clearly understood from the following detailed description taken in conjunction with the accompanying drawings and claims.

BRIEF DESCRIPTION OF THE DRAWINGS

For a more complete understanding of the presentation and the advantages thereof, reference is now made to the following brief description, taken in connection with the accompanying drawings in detailed description, wherein like reference numerals represent like parts.

DETAILED DESCRIPTION

It should be understood at the outset that although implementations of various embodiments of the present disclosure are described below, the present system may be implemented using any number of techniques, whether currently known or in existence. The present disclosure should in no way be limited to the implementations, drawings, and techniques described below, but may be modified within the scope of the appended claims along with their full scope of equivalents.

Various methods and systems provide mobile device access to back office data stores. In situations where an employee does not have a portable computer or does not have internet access for the portable computer, the employee submits a data request over a mobile device, such as a mobile phone. The data request is associated with a really simple syndication file format link to a data file in a back office data store, where the data in the data file may not be available through websites accessible by the internet. Really simple syndication is a simple extensible markup language (XML)-based system that allows users to subscribe to their favorite websites. Using really simple syndication, webmasters can put their content into a standardized format, which can be viewed and organized through really simple syndication-enabled software or automatically conveyed as new content on another website. However, embodiments of the present disclosure use really simple syndication file format links to data files in back office data stores, not as links to websites or to content formatted for websites.

A communication server receives the data request from the mobile device, and conveys the data request through a firewall to the back office data store. Because the access through the firewall uses really simple syndication format file links to the data, the access is limited to data requests only, such that security for the back office data store is increased because commands to modify data are not permitted. Then the back office data store uses really simple syndication format file links to access the data file for the communication server. In some embodiments, the data request is associated with a really simple syndication format file template link that conveys parameters through the firewall to a data manager for the back office data store, which uses the parameters specified in the template to generate customized data from the data file. The communication server formats data from the data file for the mobile device, and communicates the formatted data to the mobile device, data that is secure and otherwise inaccessible for the employee.

Figure 1:
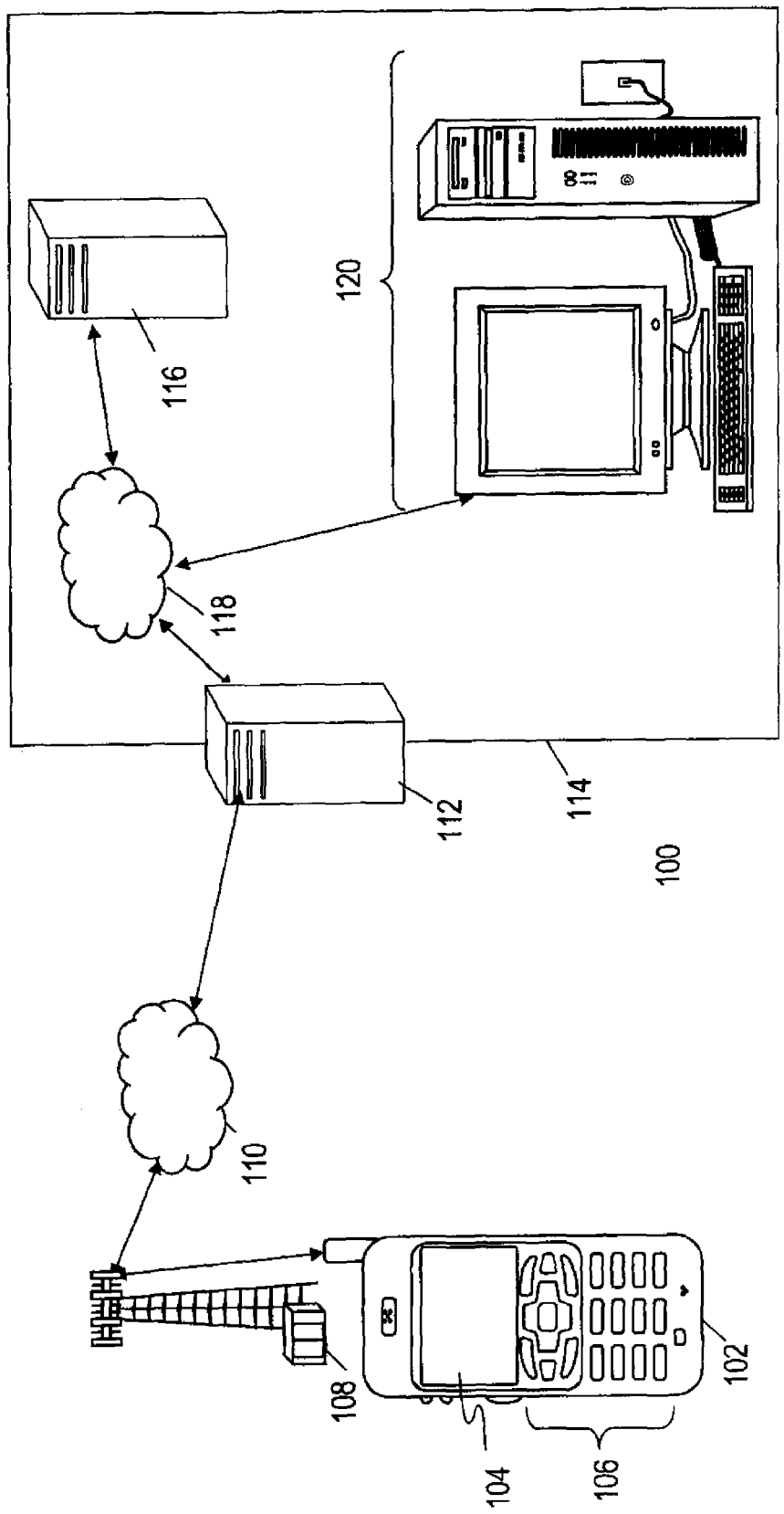
FIG. 1 shows an illustrative system for providing mobile device access to back office data stores according to some embodiments of the present disclosure.

FIG. 1 shows a system 100 for providing mobile device access to back office data stores which provides the context for the systems and methods of the present disclosure. The system 100 includes an illustrative mobile device 102. Though illustrated as a mobile phone, the mobile device 102 may take various forms including a personal digital assistant (PDA) and a mobile computer. Many suitable mobile devices combine all of these functions.

The mobile device 102 includes a display 104 and a touch-sensitive surface or keys 106 with which to interact with a user. The mobile device 102 may present options for the user to select, controls for the user to actuate, and/or cursors or other indicators for the user to direct. The mobile device 102 may further accept data entry from the user, including numbers to dial or various parameter values for configuring the operation of the mobile device 102. The mobile device 102 may further execute one or more software or firmware applications in response to user commands. These applications may configure the mobile device 102 to perform various customized functions in response to user interaction, such as requesting data from a back office data store.

The mobile device 102 communicates through a cell tower 108 and a wired network 110 to request information through a server, such as a communication server 112, which accesses information on various servers in a firewall 114, such as a back office server 116. Communications from the wired network 108 to the communication server 112 can be through an additional firewall, which is not depicted in FIG. 1. The firewall 114 permits the communication server 112 to only convey data requests. The communication server 112 interacts with the back office server 116 through an internal network 118. While one back office server is shown in FIG. 1, other servers could be present. The communication server 112 accesses data in the back office server 116, and can communicate the data to the mobile device 102 through the wired network 110 and the cell tower 108 by a standard wireless telephony protocol (such as code division multiple access) or some other means of wireless communication.

The back office server 116 can include a data store that stores data for electronic devices, such as a desktop computer 120. The system 100 is shown as including the desktop computer 120, although any electronic device having some amount of computing power coupled to a user interface can be configured to store data in data stores in the back office server 116. Among other things, servers, portable computers, personal digital assistants (PDAs) and mobile phones can be configured store data in the data stores in the back office server 116.

Figure 2:
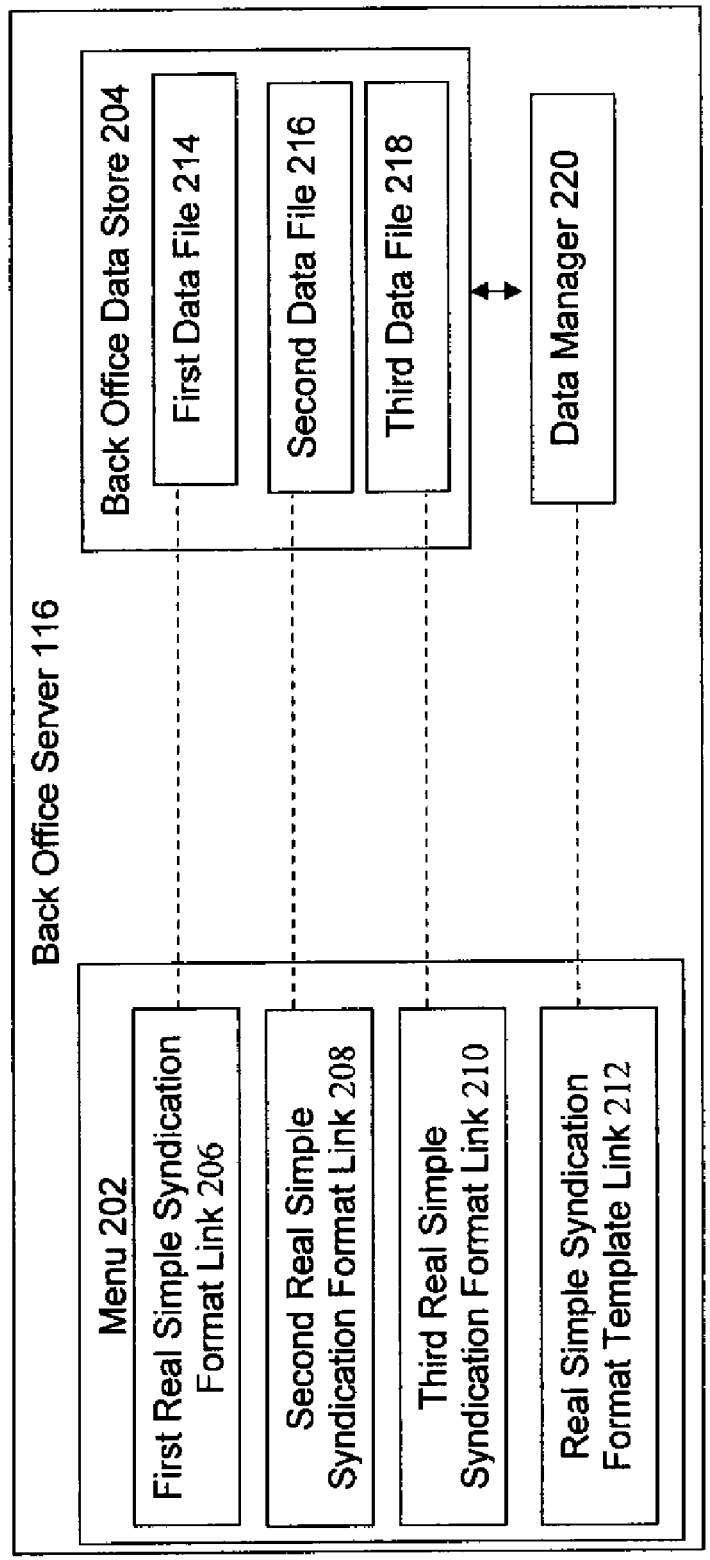
FIG. 2 shows a block diagram of a back office server according to some embodiments of the present disclosure.

FIG. 2 shows a block diagram of the back office server 116 according to some embodiments of the present disclosure. The back office server 116 includes menu 202 data and a back office data store 204. The menu 202 data includes various really simple syndication format links, such as a first really simple syndication format link 206, a second really simple syndication format link 208, a third really simple syndication format link 210, and a really simple syndication format template link 212. Although the menu 202 data includes various really simple syndication format links, other format links can be used if the other format links provide the functionality of really simple syndication format links, such as atom syndication format links and resource description framework links. The back office data store 204 includes various data files, such as a first data file 214, a second data file 216, and a third data file 218. Each of the various really simple syndication format links can link to one or more of the various data files. For example, the first really simple syndication format link 206 is linked to the first data file 214, the second really simple syndication format link 208 is linked to the second data file 216, and the third really simple syndication format link 210 is linked to the third data file 218.

However, some of the various really simple syndication format links can link to a data manager 220, such as a database manager, that manages data for the back office data store 204. For example, the really simple syndication format template link 212 links to the data manager 220 for the back office data store 204. As one example, the first data file 214 is sales totals for January, the second data file 216 is sales totals for February, and the third data file 218 is sales totals for March. If the mobile device user wishes to view combined sales totals for January and February, the mobile device user selects the really simple syndication format template link 212 from the menu 202 data displayed on the display 104, and specify the sales total as the data requested in the really simple syndication format template link 212 with the months of January and February as the data range requested in the really simple syndication format template link 212. The really simple syndication format template link 212 linked to the data manager 220 for the back office data store 204 conveys the requested customized data to the data manager 220, which queries the back office data store 204 to generate the requested customized data from the data file.

Alternatively, the back office server 116 processes the really simple syndication format template link 212 to create and convey the customized data request to the data manager 220, which queries the back office data store 204 to generate the requested customized data from the data file. The processing of the really simple syndication format template link 212 can be by the back office server 116, the data manager 220, or any combination thereof. Although depicted in FIG. 2 as part of the back office server 116, the back office data store 204 and the data manager 220 can be located in another server that is separate from the back office server 116. Upon generation, the really simple syndication format template link 212 is linked to the requested data, the sales totals for the months of January and February combined.

Figure 3:
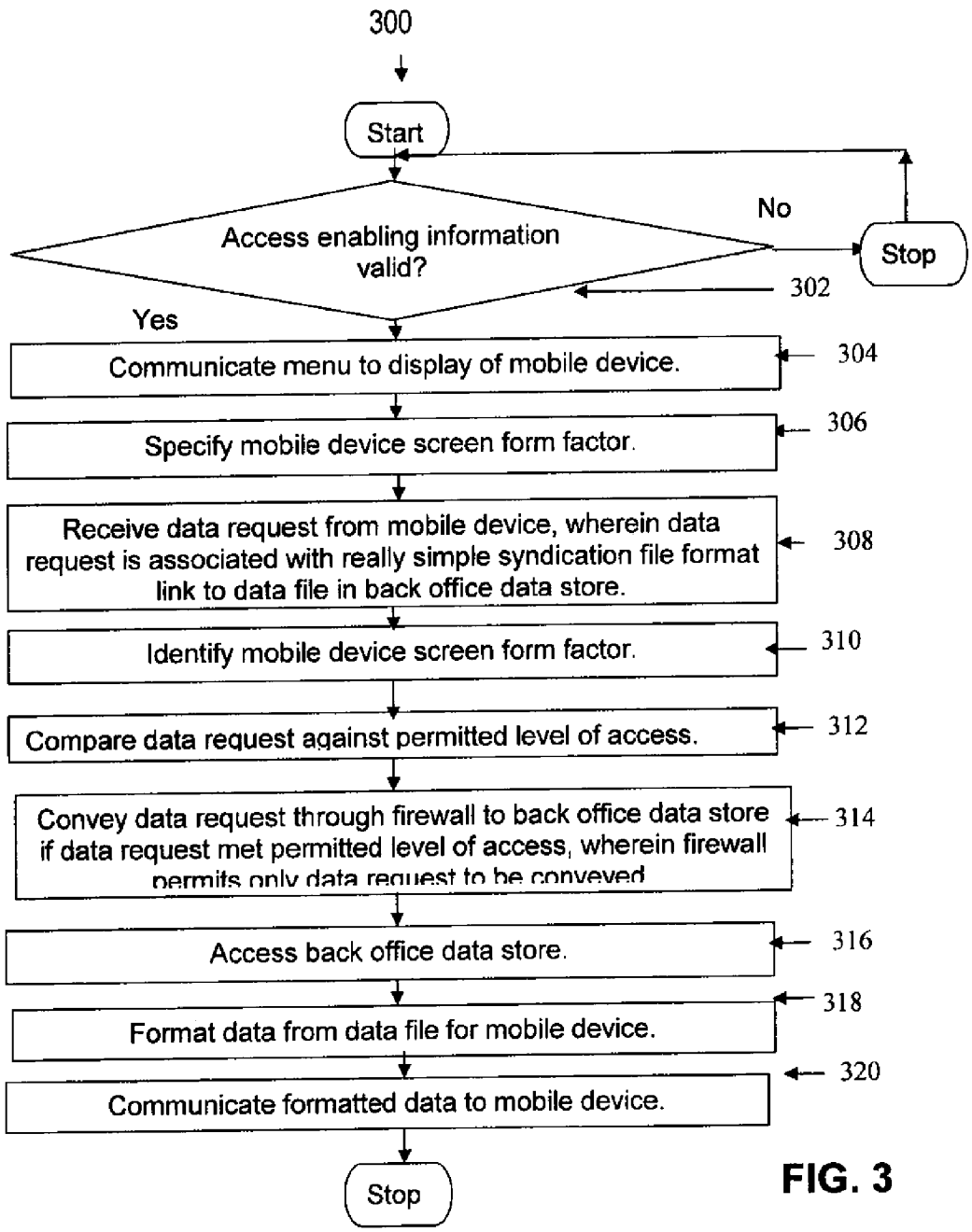
FIG. 3 shows a flowchart of a method for mobile device access to back office data stores according to some embodiments of the present disclosure.

FIG. 3 is a flowchart illustrating an embodiment of a method for mobile device access to back office data stores according to some embodiments of the present disclosure. A mobile device user uses the method to access back office data stores in a back office server from a mobile device.

In box 302, the communication server 112 determines whether access enabling information is valid. For example, the communication server 112 determines if the user of the mobile device 102, using the keys 106, enters a user identification and a user password that are valid. If the communication server 112 determines that either the user identification or the user password is invalid, the communication server 112 denies the access request. If the communication server 112 determines that the user identification and the user password are valid, the communication server 112 has identified the user of the mobile device 102 as a valid data requestor, and the method proceeds to box 304.

In box 304, the communication server 112 communicates a menu, such as the menu 202 data, to the display 104 of the mobile device 102 upon determination that the submitted access enabling information is valid. If the mobile device 102 previously requested data files, the menu communicated to the mobile device 102 may list the really simple syndication format file links to the data files previously requested. The user of the mobile device 102 can submit a data request based on a menu displayed on the display 104, where the menu lists really simple syndication format links to data files, in a back office data store. For example, the user of the mobile device 102 can submit a data request based on menu 202 data displayed on the display 104, where the menu lists really the first really simple syndication format link 206 to the first data file 214 in the back office data store 204 in the back office server 116.

In some embodiments, the user of the mobile device 102 has the option of requesting notification of any subsequent modification to a specified data file. For example, the user of the mobile device 102 requests the first data file 214, which includes end of the year forecasts. Upon requesting this file, the user of the mobile device 102 requests to be notified if any of the data representing the end of the year forecasts is subsequently modified.

In box 306, the user of the mobile device specifies a screen form factor during an initialization process that occurs as part of the data request. The screen form factor can include numerous screen specifications, such as screen size, screen shape, and screen resolution. Alternatively, the data request contains information that automatically specifies the mobile device screen form factor upon receipt by the communication server 112.

In box 308, the communication server 112 receives a data request from the mobile device 102, wherein the data request is associated with a really simple syndication file format link to a data file in a back office data store. For example, a user of the mobile device 102 uses the keys 106 to submit a data request that is received by the communication server 112. Continuing this example, the data request is associated with a really simple syndication file format link, such as the first really simple syndication format link 206, to a data file, such as the first data file 214, in a back office data store, such as the back office data store 204 in the back office server 116.

In box 310, the communication server 112 identifies a mobile device screen form factor. For example, the communication server 112 identifies the mobile device screen size based on the screen size specified by the mobile device user during an initialization process that occurred as part of the current data request or during a previous data request. Alternatively, the data request contains information that automatically specifies the mobile device screen size upon receipt by the communication server 112.

In box 312, the communication server 112 compares the data request against a permitted level of access. For example, the communication server 112 uses the identity of the user, as determined in box 302, to identify the level of access permitted for the identified user. Continuing this example, the level of access for a vice-president is to all data files in the back office data store 204, whereas the level of access for a first-year customer service representative is to a limited sub-set of the data files in the back office data store 204. The permitted level of access can differ for various groups of users, and this level of access can also determine the menu options that the communication server 112 communicates to the display 104 of the mobile device 102.

In box 314, the communication server 112 conveys the data request through the firewall 114 to the back office data store 204 if the data request met the permitted level of access, wherein the firewall permits only the data request to be conveyed. For example, if a vice-president of marketing requests confidential data, the communication server conveys only the data request through the firewall 114 to the back office data store 204. In contrast, if a first year customer service representative requests confidential data not accessible to first year customer service representatives, the communication server 112 does not convey the data request through the firewall 114 to the back office data store 204.

In addition to the security features offered by checking of user identifications, user passwords, and permitted levels of access, the communication server 112 provides an additional security feature by not conveying any communications through the firewall 114 other than data requests. As such, access through the firewall 114 is limited to only data requests, which protects the back office data server 116 from commands that can change data in the back office data store 204.

In box 316, the communication server 112 accesses the back office data store 204. For example, the communication server 112 accesses the back office data store 204 by conveying the first really simple syndication format link 206 linked to the first data file 214 through the firewall 114 to access the first data file 214 in the back office data store 204 in the back office server 116. The back office data store 204 responds to receipt of the data request through the firewall 114 by referencing the data file specified by the file link and conveying the requested data back through the firewall 114 to the communication server 112. Alternatively, the communication server 112 accesses the back office data store 204 by conveying the customized parameters in the really simple syndication format template link 212 to the data manager 220 for the back office data store 204. Then the data manager 220 queries the back office data store 204 to generate the requested customized data from the data file.

In box 318, the communication server 112 formats the data from the data file for the mobile device 102. For example, the communication server 112 formats the data from the first data file 215 for display on the display 104, based on a mobile device screen size, of the mobile device 102. Although this example illustrates the formatting of a data file, the data formatted can be a subset of a data file, selected through the use of a really simple syndication format file template link that enables a user to specify the data requested through the use of a template.

In box 320, the communication server 112 communicates the formatted data to the mobile device 102. For example, the communication server 112 sends the formatted first data file 214 through the wired network 110 and the tower 108 to be displayed on the display 104 of the mobile device 102.

Figure 4:
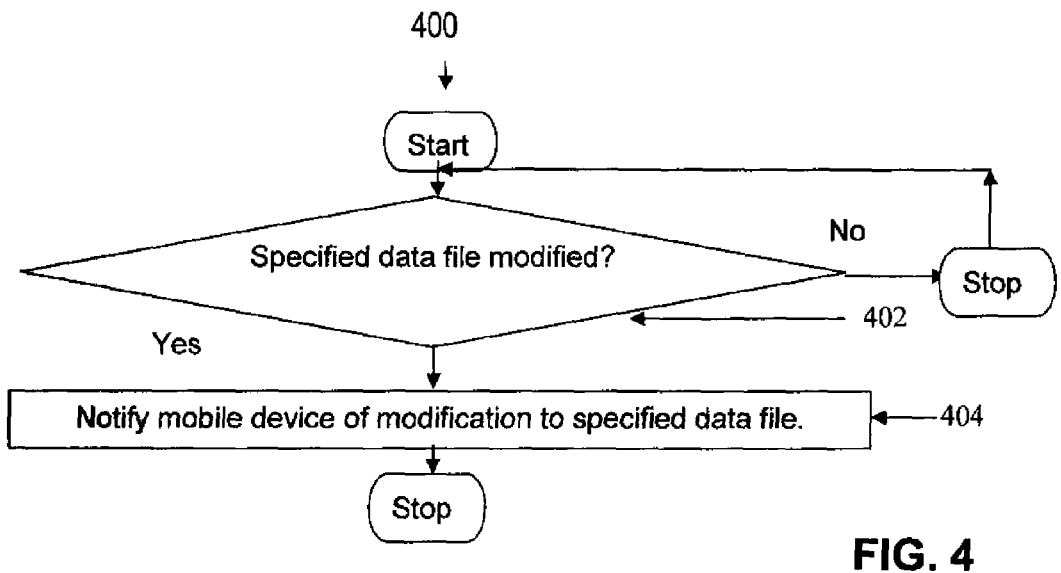
FIG. 4 shows a flowchart of a notification method for mobile device access to back office data stores according to some embodiments of the present disclosure.

FIG. 4 is a flowchart illustrating an embodiment of a notification method for mobile device access to back office data stores according to some embodiments of the present disclosure. The back office server 116 uses the method to respond to modifications to specified data files by sending a notification to the mobile device 102, which insures that the user of the mobile device 102 has the opportunity to stay current by viewing modified data files.

In box 402, the back office server 116 determines whether a modification occurs to a specified data file. Alternatively, the communication server 112 determines whether a modification occurs to a specified data file. A specified data file is a data file for which the user of the mobile device 102 has requested notification upon subsequent modification to the data file, as described above in box 304. If the back office server 116 determines that a modification occurs to a specified data file, the method continues to box 404. If the back office server 116 determines that no modification occurs to a specified data file, the method returns to box 402 to continue checking for modifications to specified data files.

In box 404, the back office server 116 communicates through the communication server 112 to notify the mobile device 102 of modifications to a specified data file. For example, if the data representing the end of the year forecasts is subsequently modified, the back office server 116 communicates through the communication server 112 to notify the mobile device 102 of the subsequent modification, a process that insures that the user of the mobile device 102 has the most current end of the year forecasts and is notified if the requested end of the year forecasts are updated. Alternatively, if the data representing the end of the year forecasts is subsequently modified, the communication server 112 requests modifications to the specified data file from the back office server 116.

Figure 5:
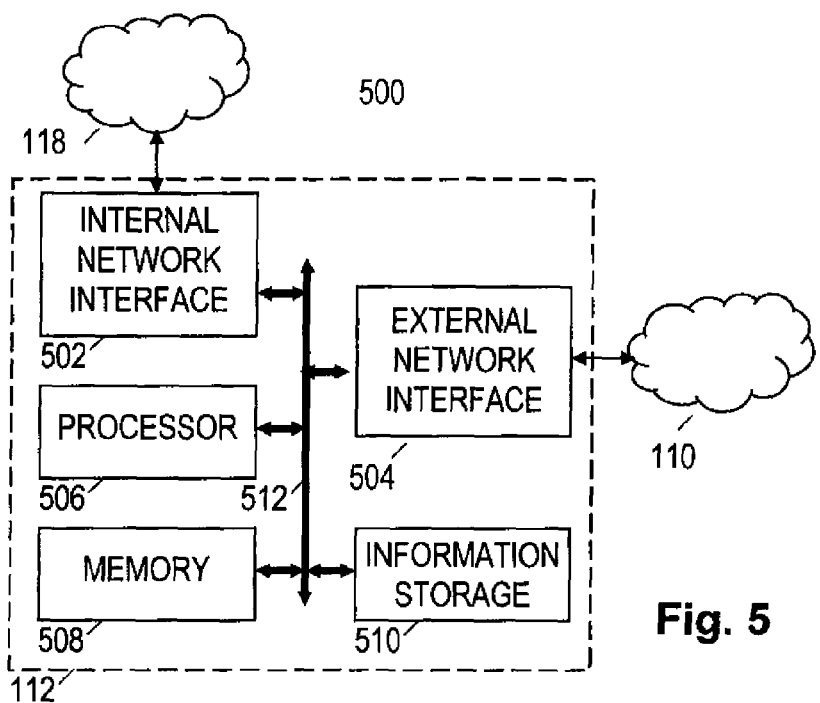
FIG. 5 shows an illustrative general purpose server suitable for implementing portions of the several embodiments of the present disclosure.

FIG. 5 shows a simplified functional block diagram 500 for the illustrative communication server 112 system 100 according to some embodiments of the present disclosure. The communication server 112 may comprise an internal network interface 502, an external network interface 504, a processor 506, a memory 508, an information storage device 510, and a bus 512. The communication server 112 may be a bus-based server, with the bus 512 interconnecting the other elements and carrying communications between them. The internal network interface 502 enables the processor 506 to communicate with remote systems via the internal network 118. The external network interface 504 enables the processor 506 to communicate with remote systems via the wired network 110.

The processor 506 gathers information from other system elements, including input data from the internal network interface 502 and the external network interface 504, and program instructions and other data from the memory 508, the information storage device 510, or from a remote location via the internal network interface 502. The processor 506 carries out the program instructions and processes the data accordingly. The program instructions may further configure the processor 506 to send data to other system elements, including information for the mobile device user which may be communicated via the external network interface 504 and the display 104, information such as data requested by the mobile device 102 from the back office server 116.

The memory 508 may serve as a low-latency temporary store of information for the processor 506, and the information storage device 510 may serve as a long term (but higher latency) store of information, including information such as data stored in the back office data store 204. The processor 506, and hence the communication server 112 as a whole, operates in accordance with one or more programs stored on the information storage device 510. The processor 506 may copy portions of the programs into the memory 508 for faster access, and may switch between programs or carry out additional programs in response to data requests from the mobile device 102. The additional programs may be retrieved from the information storage device 510 or may be retrieved from remote locations via the internal network interface 502. One or more of these programs configures the communication server 112 system to carry out at least one of the mobile device access to back office data stores methods disclosed herein.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

What is claimed is:

1. A computer implemented method, comprising:
   receiving, by a communication server, a data request from a mobile device, wherein the data request is associated with a really simple syndication file format link template to a data file in a back office data store;
   conveying, by the communication server, the data request through a firewall to a data manger for the back office data store, wherein the firewall only permits conveying data requests associated with really simple syndication file format links;
   accessing, by the data manager, the data file responsive to the data request;
   using, by the data manager, the really simple syndication file format link template to generate customized data from the data file; and
   communicating, by the communication server, the customized data from the data file to the mobile device.

2. The computer implemented method of claim 1 further comprising determining whether access enabling information is valid.

3. The computer implemented method of claim 1 further comprising comparing the data request against a permitted level of access, and conveying the data request through the firewall to the back office server if the data request met the permitted level of access.

4. The computer implemented method of claim 1 further comprising notifying the mobile device of a subsequently modified data file.

5. The computer implemented method of claim 1 further comprising formatting, by the communication server, the data file for the mobile phone.

6. The computer implemented method of claim 5 wherein the data request identifies a mobile device screen form factor, and wherein the communication server formats the data file according to the mobile device screen form factor.

7. A computer implemented system for a communication server, comprising:
   a memory;
   a processor configured to execute communication server software in the memory, where the communication server receives a data request from a mobile device, wherein the data request is associated with a really simple syndication file format link to a data file in a back office data store; conveys the data request through a firewall to the back office data store, wherein the firewall only permits the communication server to convey data requests associated with really simple syndication file format links; receives responsive to the data request the data file from the back office data store; and communicates the data file to the mobile device; and
   a data manager for the back office data store inside the firewall, wherein the data manager receives a second data request, the second data request associated with a really simple syndication file format link template, and wherein the really simple syndication file format link is used by the data manager to generate customized data from the data file.

8. The computer implemented system of claim 7 wherein the communication server further determines whether access enabling information is valid.

9. The computer implemented system of claim 7 wherein the communication server further compares the data request against a permitted level of access, and conveys the data request through the firewall to the back office server if the data request met the permitted level of access.

10. The computer implemented system of claim 7 wherein the communication server further notifies the mobile device of a subsequently modified data file.

11. The computer implemented system of claim 7 wherein the communication server further formats the data file for the mobile phone.

12. The computer implemented system of claim 11 wherein the data request identifies a mobile device screen form factor, and wherein the communication server formats the data file according to the mobile device screen form factor.

13. A computer implemented system, comprising:
a back office data store;
a mobile device;
a communication server that receives a data request from the mobile device, wherein the data request is associated with a really simple syndication file format link to a data file in the back office data store; compares the data request against a permitted level of access; conveys the data request through a firewall to the back office data store if the data request met the permitted level of access, wherein the firewall only permits the communication server to convey data requests associated with really simple syndication file format links; receives responsive to the data request the data file from the back office data store; and communicates the data file to the mobile device; and
a data manager for the back office data store inside the firewall that receives a second data request, wherein the second data request is associated with a really simple syndication file format link template, and wherein the really simple syndication file format link is used by the data manager to generate customized data from the data file.

14. The computer implemented system of claim 13 wherein the communication server further determines whether access enabling information is valid.

15. The computer implemented system of claim 13 wherein the communication server further notifies the mobile device of a subsequently modified data file.

16. The computer implemented system of claim 13 wherein the communication server further formats the data file for the mobile phone.

17. The computer implemented system of claim 16 wherein the data request identifies a mobile device screen form factor, and wherein the communication server formats the data file according to the mobile device screen form factor.

* * * * *